United States Patent [19]
Yoshida et al.

[11] Patent Number: 4,841,438
[45] Date of Patent: Jun. 20, 1989

[54] SYSTEM FOR GENERATING MASK PATTERN FOR VECTOR DATA PROCESSOR

[75] Inventors: Akira Yoshida; Yuuichi Sasaki, both of Kawasaki, Japan

[73] Assignee: Fujitsu Limited, Japan

[21] Appl. No.: 909,335

[22] Filed: Sep. 19, 1986

[30] Foreign Application Priority Data

Sep. 19, 1985 [JP] Japan ................. 60-207502

[51] Int. Cl.[4] ............................ G06F 15/16
[52] U.S. Cl. ................................ 364/200
[58] Field of Search ... 364/200 MS File, 900 MS File

[56] References Cited

U.S. PATENT DOCUMENTS

4,621,324 11/1986 Ushiro et al. ............... 364/200
4,630,192 12/1986 Wassel et al. ............... 364/200
4,680,730 7/1987 Omoda et al. ............... 364/900

Primary Examiner—Gareth D. Shaw
Assistant Examiner—Jonathan C. Fairbanks
Attorney, Agent, or Firm—Staas & Halsey

[57] ABSTRACT

A system for generating a mask pattern for a vector data processor is described having at least a mask register and a vector register in which, when the value of the mask register is "1", a calculation is executed for the corresponding element of the vector register, and when the value of the mask register is "0", a calculation is not executed, in accordance with the so-called calculational mask function. The system includes: a designation unit for designating sequential i elements of "0" or "1" from the head element of the mask register, and the subsequent sequential j elements of "1" or "0"; a control unit for rendering the i elements to be "0" or "1", the j elements to be "1" or "0", and the remaining entire elements to be all "0's" or all 1's, when "i" plus "j" is smaller than a vector length which is the object of calculation of a vector data operand for use in a vector instruction; and a desired mask pattern of "0" or "1" is able to be generated in the mask register.

6 Claims, 6 Drawing Sheets

Fig. 4A MASK PATTERN BY SYSTEM OF FIG 7 (MODIFIER MI="0")

Fig. 4B MASK PATTERN BY SYSTEM OF FIG 7 (MODIFIER MI="1")

Fig. 5 FORMAT OF INSTRUCTION OF VECTOR GENERATE MASK

Fig. 6 PATTERN TO BE STORED INTO A MASK REGISTER

Fig. 7

SYSTEM FOR GENERATING MASK PATTERN FOR VECTOR DATA PROCESSOR

BACKGROUND OF THE INVENTION

The present invention relates to a system for generating a mask pattern for a mask register (MR) in a vector data processing apparatus, for use in a supercomputer, having a calculational mask function by means of the mask register.

In recent years, with the increased use of vector processors, that is, supercomputers, the vector processor have been used in the fields of fast Fourier transformation, such as in radio astronomy or image processing. A performance evaluation of the application program and other programs is necessary.

As a result, the problems in vector data processing are becoming known. For example, it is now known that the generating capability of a mask pattern of the so-called mask calculation by dint of the mask operand, conspicuously enhances the processing capability of the vector processor. Thus the development of a system for generating the mask pattern with a high efficiency has long been desired.

Figure 2:
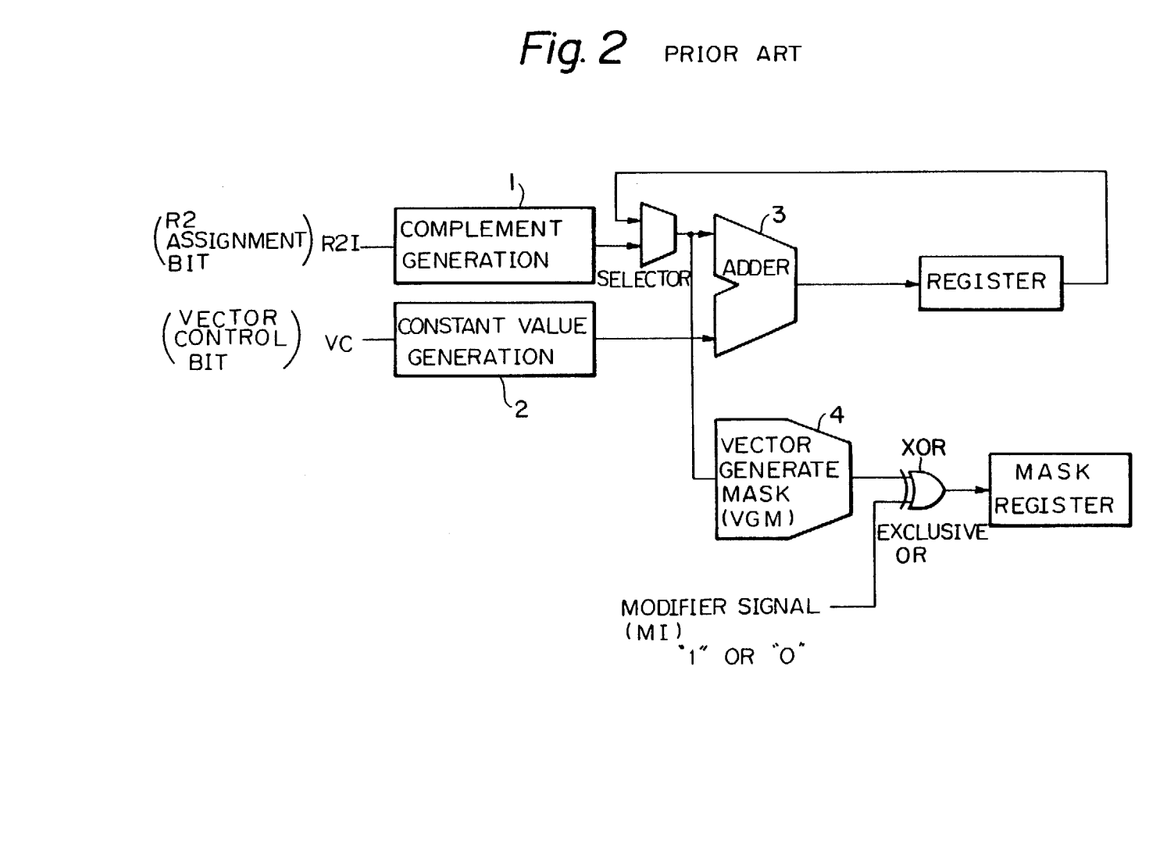
FIG. 2 is a schematic view showing a system for generating a mask pattern in the prior art.

A prior art mask pattern generation system will be described with reference to FIG. 2.

In the prior art, a mask pattern generation instruction (hereinafter, referred to as VGM) can not make a mask pattern such that only a specified element of a mak register is "1" or "0" and the other elements are all "0" or all "1".

That is, when the VGM instruction is executed, the value at the R2 portion of an instruction (hereinafter, referred to as R2I) is input to an adder 3, after a complement representation of 1 is obtained by a complement number generating circuit (COMP) 1.

A definite number, for example, "1" from a constant circuit (CNST) 2 and a complement of 1 in the above-mentioned R2I are added, so a definite number "1" is subtracted from said R2I. Then, the output of a decoder (VGM) 4 and a modifier (MI) designated by said VGM instruction execute an exclusive OR operation in an exclusive OR circuit XOR, to store the result in the head element of mask registor which is assigned by the VGM instruction.

That is to say, if the above-described modifier (MI) is "0", "000 - - - 0" is stored, whereas, if the modifier (MI) is "1", the system functions so that "111 - - - 1" is stored.

When the above-described subtraction result is 37 0", the output of said decoder (VGM) 4 is "1", and "1" or "0" is stored in the element of the mask register assigned at that time, according to the value of the modifier (MI).

Therefore, the output of the decoder (VGM) 4 is "0", and functions so that "000 - - - 0" or "111 - - - 1" is stored into the mask register for the vector length (VL).

Figure 3A:
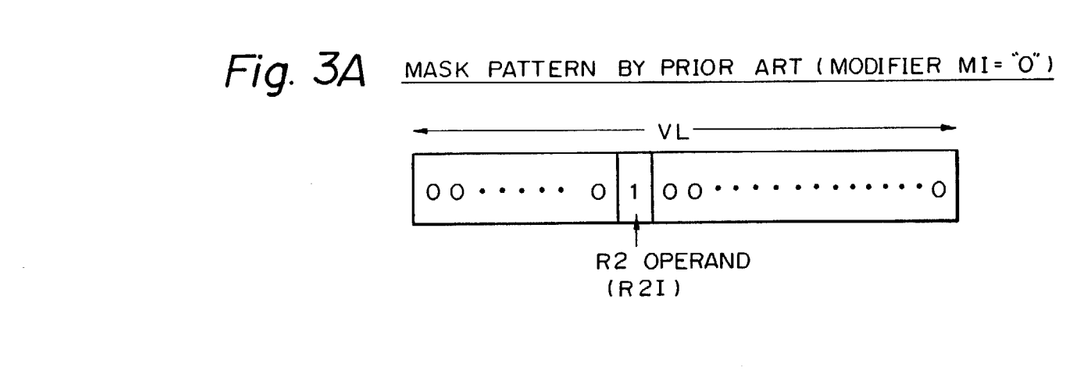
FIGS. 3A and 3B show examples of mask patterns in the prior art.
Figure 3B:
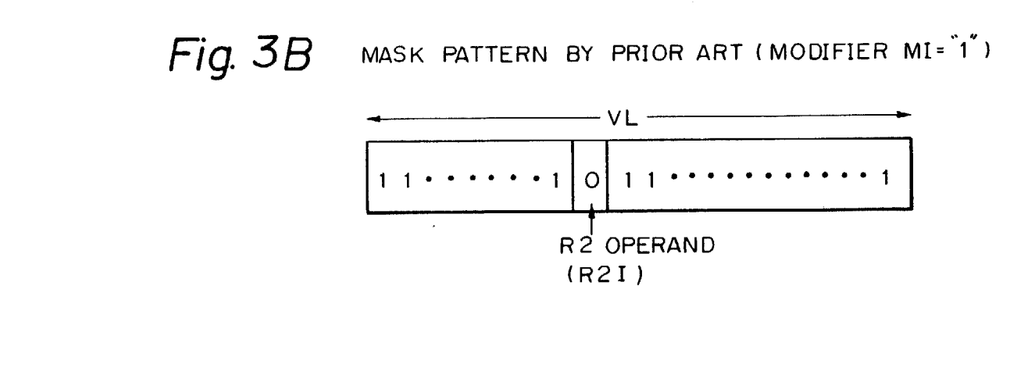

The example of a mask pattern so generated is shown in FIGS. 3A and 3B.

Figure 4A:
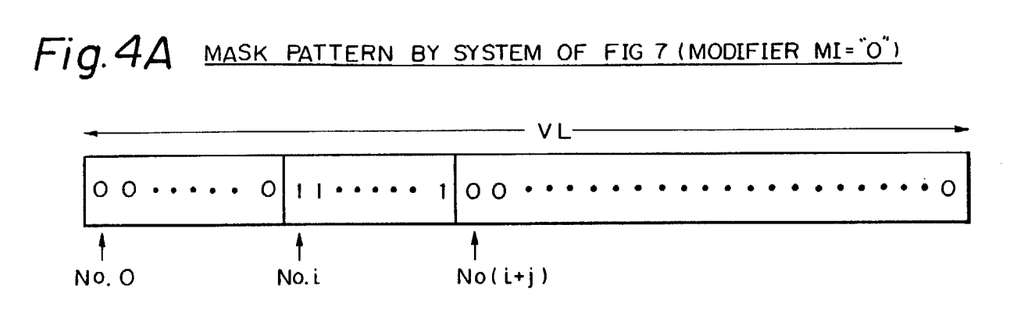
FIGS. 4A and 4B show examples of mask patterns necessary for vector operation according to the present invention.
Figure 4B:
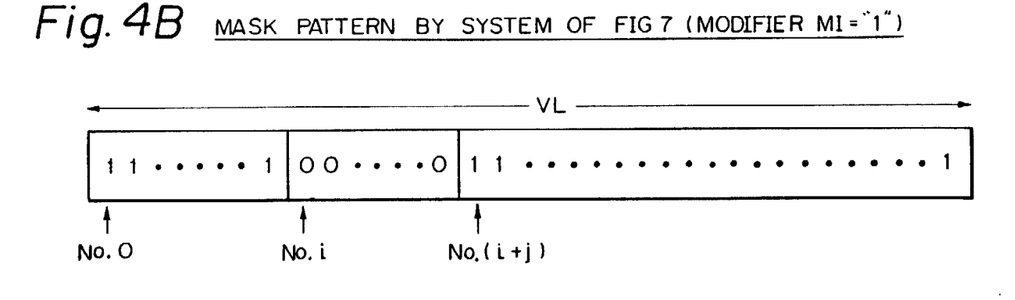

Therefore, in order to generate a mask pattern which is necessary to the vector operation as shown in FIGS. 4A and 4B, first, a plurality of vector instructions and scalar instructions are necessary, and second, a mask pattern is stored in the memory in advance and must be loaded into the mask register from said memory every time it is needed.

For example, when such a pattern is generated by the aforementioned first vector instruction, the following object program is created and executed.

| | | |
|---|---|---|
| (i) | L | GR1 = 1 |
| (ii) | L | GR2 = i |
| (iii) | L | GR3 = j |
| (iv) | VGS | VR1, GR1 |
| (v) | VCS* | MR1, GR2, VR1 |
| (vi) | VCS* | MR2, GR3, VR1 |
| (vii) | VNM | MR3, MR2, MR1 |

In the above-described program, the first three load instructions (i) to (iii), GR1=1, GR2=i, and GR3=j are set to a respective general-purpose register GR.

The next vector generation series (VGS) instruction creates an arithmetic progression which represents the content (in this example "1") of the general-purpose register (GR1) inthe vector register (VR1). That is, in this example, a progression

VR1: 1, 2, 3, 4, - - - VL is stored therein.

In the following vector comparison scalar (VCS*) instruction (v), a content of GR2 and VR1, which was created by the above-mentioned instruction, is compared and then, if

GR2<VR1,

"1" is introduced into a respective element of a corresponding mask register. This is expressed as follows:

MR1; 000 - - - 01111 - - - 1 (From the i-th element converted to "1")

Similarly, in the vector comparison scalar (VCS*) instruction (vi), a content of GR3 and VR1, which is created by the above-mentioned instruction, is compared and then, if

GR3>VR1,

"1" is introduced into a respective element of the corresponding mask register. This is expressed as follows:

MR2: 111 - - - 1000 - - - 0 (From the j-th element, converted to "0")

In the last vector and mask (VNM) instruction (vii), taking the logical product of a mask register MR1 and MR2, the product is stored in a mask register (MR3).

As a result, the following bit pattern is obtained in a mask register (MR3). That is, MR3; 000 - - - 0111 - - - 1000 - - - 0 (From the i-th element to the j-th minus 1 element, equal to "1")

Therefore, in the case where a mask pattern in which a plurality of "1"'s or "0"'s are placed between "0" or "1", is generated in accordance with a vector instruction, there is a problem that the overhead is increased.

According to the above-mentioned second point, since only the mask pattern stored in a memory in advance can be used, there is a problem that the desired mask pattern can not be obtained each time the program is run.

SUMMARY OF THE INVENTION

It is an object of the present invention to provide an improved system for generating a mask pattern for a vector data processor having a mask register and a vector register in which the increase of the overhead is prevented, and the desired repetitive pattern can be formed in the mask register when such repetitive pattern is needed.

According to a fundamental aspect of the present invention, there is provided a system for generating a mask pattern for a vector data processsor having a mask register and a vector register in which, when the value of the mask register is "1", a calculation is executed for the corresponding element of the vector register, and when the value of the mask register is "0", a calculation is not executed, in accordance with the so-called calculational mask function, the system including:

designation means for designating sequential "i" elements of "0" or "1" from the beginning element of the mask register and subsequent sequential "j" elements of "1" or "0"; and control means for rendering the "i" elements to be "0" or "1", the "j" elements to be "1" or "0", and the remaining elements to be all "0's" or all "1's", when "i" plus "j" is smaller than a vector length VL which is the object of calculation of a vector data operand used in a vector instruction, wherein a desired mask pattern of "0" or "1" can be generated on the mask register.

Moreover, according to another aspect of the present invention, there is provided a system for generating a mask pattern for a vector data processor having a mask register and a vector register in which, when the value of the mask register is "1", a calculation is executed for the corresponding element of the vector register, and when the value of the mask register is "0", a calculation is not executed, in accordance with the so-called calculational mask function, the system including:

designation means for designating sequential "i" elements of "0" or "1" from the beginning element of the mask register and subsequent sequential "j" elements of "1" or "0"; and control means for instructing the system to repeat "i" elements of "0" or "1" and "j" elements of "1" or "0" until a vector length which is the object of calculation of a vector data operand used in a vector instruction is attained, when "i" plus "j" is smaller than the above-mentioned vector length;

wherein desired mask patterns including repetitive patterns can be generated in the mask register.

The means for solving the problems according to the present invention will be described hereinafter with reference to the figures.

Figure 7:
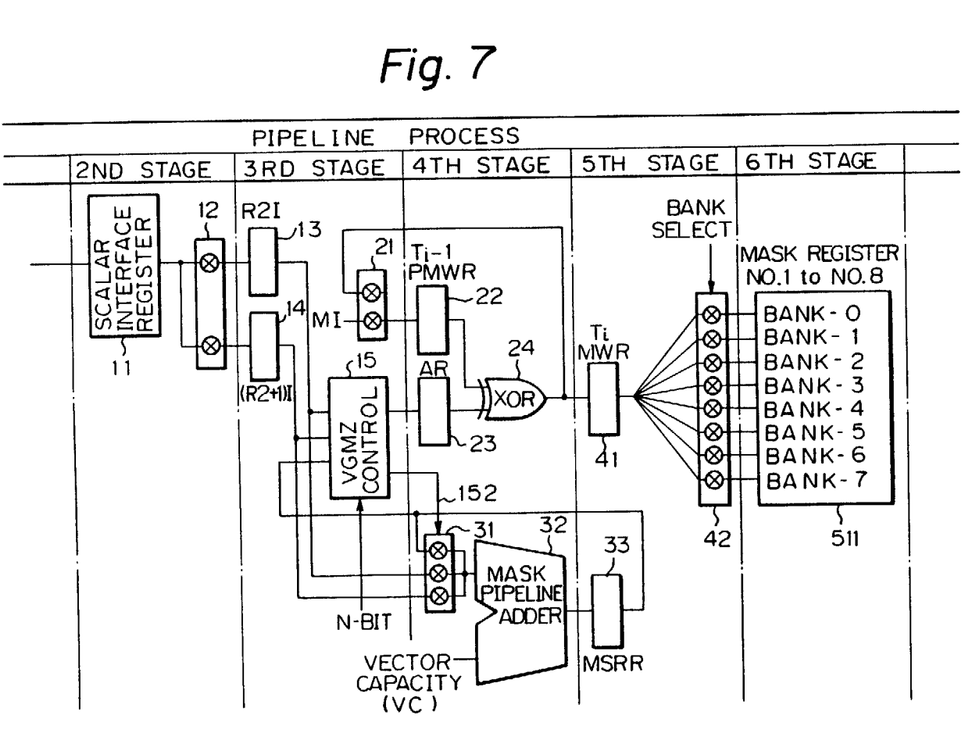
FIG. 7 is a block diagram of a vector data processing apparatus according to an embodiment of the present invention.

FIG. 7 is a block diagram showing an embodiment in accordance with the present invention. As shown there is provided an instruction means for generating a mask pattern with a vector period, i.e., a periodic pattern such that "0" of the i-bits and "1" of the j-bits is repeated, or other specified means, wherein sequential i elements of "0" or "1" are stored in a head element of a mask register MR, then successively, the sequential j elements of "1" or "0" are stored therein, and the remaining elements of all "0" or all "1" are stored. In order to generate a mask pattern which repeats the above-mentioned (i+j) elements of "0" or "1" combination pattern until a vector length VL is attained, the instruction means for generating a mask pattern for the vector period (hereinafter referred to as VGMZ) or other means are provided.

There is provided: a scalar interface register 11; gate means 12; a register (R2I) 13 which, after executing the intruction, sets the i contents of the R2 portion in the above-mentioned instruction; a register {(R2+1)I} 14 which sets the j contents of the R2 portion plus 1, in the above-mentioned instruction; a register (AR) 23 which, when at the starting time of execution of the above-described VGMZ instruction, is "0" and then when the VGMZ control portion 15 detects the later event variation, inverts the initial value; and a register (PMWR) 22 which, after the modifier portion MI of the VGMZ instruction has been initialized, the setting of the output of the exclusive OR circuit (XOR) 24 is repeated.

First, with regard to the content (designating the i elements as described before) of the afore-mentioned register (R2I) 13, as the system is subtracting a constant value (VC), for example, "1" by a mask pipeline adder (MP ADDER) 32, the output value of the exclusive OR circuit (XOR) 24 between the register (A) 23 and the register (PMWR) 22 is stored from the head element of the mask register (MR) in sequence through the register (MWR) 41.

When the value of the above-mentioned mask pipeline adder (MP ADDER) 32 is "0", that is, the i elements designated by the register (R2I) 13 are detected, the VGMZ control portion 15 recognizes that an event variation has ocurred and sets the aforementioned register (AR) 23 to "1" and the calculation of an exclusive OR is carried out by the register (PMWR) 22 and the exclusive OR circuit (XOR) 24, and the system functions to store "1" in the corresponding elements of the mask register (MR).

As a result, if the value of the modifier (MI) portion is "0", the i elements of "0" are stored in the mask register (MR), and "1" is stored in the (i+1)-th element.

Hereafter, the content (designating the above-mentioned j elements) of the register {(R2+1)} 14 is input into the mask pipeline adder (MP ADDER) 32, and as a result of the same subtraction processing, the system stores i elements of "0" and j elements of "1" in the mask register (MR).

Moreover, as the occasion demands, gate means 31 will be provided for repeating the above-mentioned (i+j) elements of 0/1 pattern as a fundamental pattern for the vector length (VL).

A mode of operation in accordance with the present invention will be now described in detail.

In the vector data processor having at least a mask register (MR) and a vector register (VR) to enable executing the so-called calculation mask function in which, when the value of the mask register (MR) is "1" responsive to a respective element of the vector register (VR), a calculation is executed for the corresponding element of the vector register (VI). Alternatively when the value of the mask register is "0", a calculation is not executed and there is provided an instruction means for generating a mask periodic pattern for a vector (VGMZ) or other means, wherein the mask register MR, which is a first operand R1 of said instruction, designates "0" to be written into the elements "A" of the element number 0 up to the numbers denoted by the second operand R2 minus 1 while "1" is written into the elements "B" of the element number denoted by the second operand R2 up to the number denoted by the operand of the second operand R2 plus 1 minus 1, and further, the mask pattern is generated repetitively as long as the elements denoted by, for example, the vector length (VL), are regarded as the sum (A+B) of a period.

As a result, it is effective if the instruction or means for generating a periodic pattern of a vector is only executed or activated, and an arbitrary repetitive pattern can be created on a mask register.

DETAILED DESCRIPTION OF THE PREFERRED EMBODIMENTS

Figure 1:
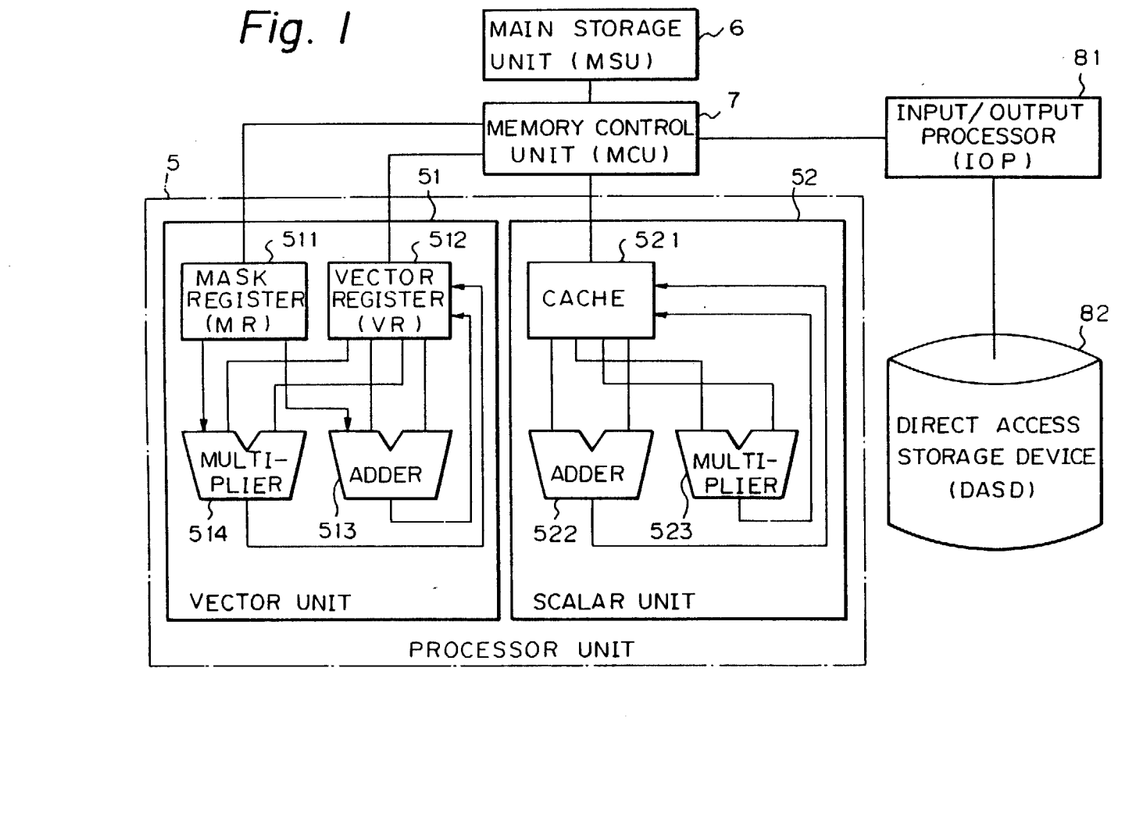
FIG. 1 is a schematic block diagram of a vector data processing apparatus to which the present invention is to be applied.

FIG. 1 is a schematic block diagram of a vector data processing apparatus to which the present invention is to be applied.

The vector data processing apparatus is composed of a main storage unit "MSU" 6, a memory control unit "MCU" 7, a processor unit 5, an input/output processor "IOP" 81 and a direct access storage device "DASD" 82.

The processor unit 5 is composed of a vector unit 51 and a scalar unit 52. The vector unit 51 is composed of: a mask register "MR" 511 connected to the memory control unit 7; a vector register "VR" 512 connected also to the memory control unit 7; an adder 513, which receives two outputs of the vector register 512, and the output of addition is delivered to the vector register 512; and a multiplier 514, which receives two outputs of the vector register 512, and the output of multiplication is delivered to the vector register 512. The scalar unit 52 is composed of: a cache 521 which is a unit of fast coordinate-addressable storage to hold data with high access probability; an adder 522, which receives two outputs of the cache 521, and the output of addition is returned to the cache 521; and a multiplier 523, which receives two outputs of the cache 521, and the output of multiplication is returned to the cache 521.

FIG. 7 is a block diagram of a vector data processing apparatus according to an embodiment of the present invention. Functional blocks requisite for executing the present invention are a VGMZ control portion 15, a Register (AR) 23 a Register (PMWR) 22, and an Exclusive OR circuit (XOR) 24. A mask pipeline adder 32 and related register (MSRR) 33 are also provided.

Figure 5:
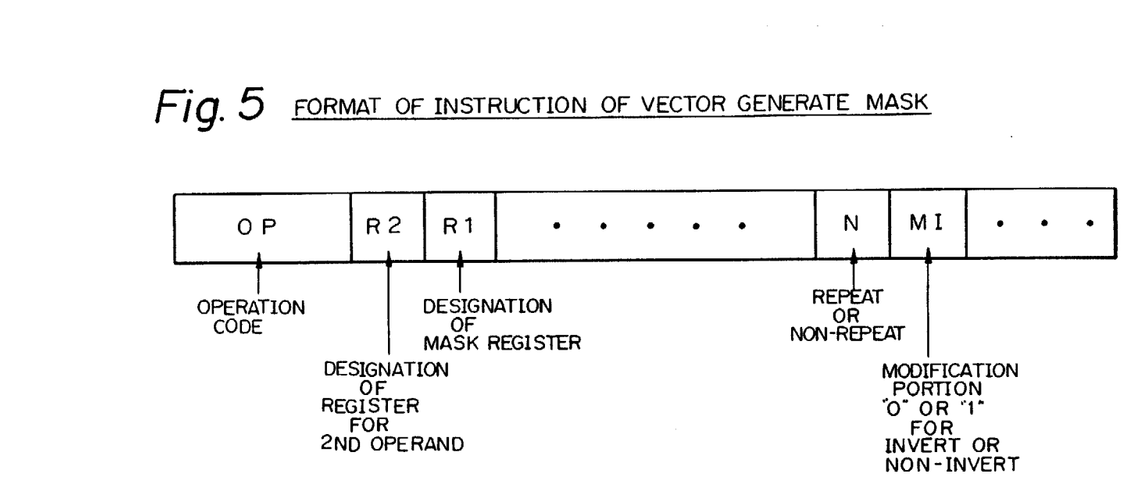
FIG. 5 shows a format of instruction of a vector generated mask according to the present invention.

An example of a format of an instruction for generating a periodical mask pattern necessary for the present invention is designated in FIG. 5. Due to this VGMZ instruction, a plurality of "0"s are stored in a mask register MR denoted by the R1 portion from the head element to the element number minus 1 as shown by a general-purpose register denoted by the r2 portion and a plurality of "1"s are stored therein from the element code shown by the general-purpose register denoted by the R2 portion, to the element code minus 1 as shown by the general-purpose register denoted by (R2+1).

When the bit of the portion "N" according to the format of FIG. 5 is "0", a sequence of "0" is stored up to the end of the vector length (VL) following the above-mentioned bit pattern, and when the bit of the portion "N" according to the format of FIG. 5 is "1", the repetitions of the above-mentioned bit pattern from the element code "0" are carried out up to the end of the vector length (VL) following the above-mentioned bit pattern.

Then, when the bit of the portion "MI" is "ON", the element negating each bit of the above-mentioned operand is stored in the mask register MR designated by the portion "R1".

When the function which the above-mentioned instruction "VGMZ" designates is implemented. The circuit as shown in FIG. 7 is operated by a pipe-line system.

In FIG. 7, the case when the modifier portion MI is "0" is described.

At the third stage of the pipe-line, the content of the general-purpose register designated by the above-mentioned portion "R2", and the content of the general-purpose register designated by the portion "R2+1" are set in a register "R2I" 13 and a register "(R2+1)I" 14, respectively. In addition, in the VGMZ control portion 15, a register "AR" 23 is set to "0". Then, the value of the above-mentioned MI portion is set in a register PMWR 22 by means of a start bit, not shown in the figure, to initialize the registers R2I, (R2+1)I and PMWR.

At the fourth stage, an exclusive OR value of the content of the above-mentioned register "AR" 23 and of the content of the register "PMWR" 22 is calculated by an exclusive OR (hereinafter referred to as XOR) circuit 24 and the result is fed back to an input gate 21 of register "PMWR" 22 and is set to the register "PMWR" 22. That is, when the register "PMWR" 22 starts executing the instruction, after initialization by the above-mentioned MI portion, the register "PMWR" functions to always hold the content of exclusive OR circuit 24.

At the fifth stage, the output of the above-mentioned XOR circuit 24 is sent to a register "MWR" 41 through a bank select 42, and at the sixth stage, the output is stored in a mask register "MR" designated by the RI portion.

Until the event variation from the "VGMZ" control portion 15 is output, the above-mentioned operation is repeated. That is to say, a sequence of "0" is stored continuously into the mask register "MR".

On the other hand, in a mask pipeline adder "MPA" 32, a register "R2I" 13 is first selected through a control line 152 from the VGMZ control portion 15 and every time the above-mentioned fourth and fifth stages are repeated, e.g., when a definite number "VC" is subtracted from the content of the register "R2I" 13 to be "0", the above-mentioned VGMZ control portion 15 detects it and recognizes that an event variation has occurred. Consequently, the above-described register "AR" 23 is set to "1", then at the next equivalent stage, the register "AR" 23 operates to return to "0" again.

As a result, the exclusive OR "XOR" circuit 24 comes to output "0"→"1" and "1" is stored in the mask register "MR" and also is fed back to an input gate 21 of the register "PMWR" 22 to set the content of the register "PMWR" 22 to "1".

The mask pipeline adder 32, functions to subtract the above-mentioned constant "VC" from the contents of the register ("(R2+1)I"14. Since the register "AR" 23 remains at a state of "0" until the result of the subtraction operation is again "0", "1" keeps storing in the mask register "MR" as mentioned above. Further on, "0" is output by the mask pipeline adder 32, the VGMZ control portion 15 detects the signal again to recognize the event variation and sets register "AR" 23 to "1", so the exclusive OR circuit "XOR" 24 becomes "1"→37 0", and when the register "PMWR" 22 is set to "0", "XOR" returns to the initial state.

After the above-mentioned operation, into the locations from the element code 0 to the element code designated by the register "R2I" 13 minus 1 (that is), (i-1) inthe mask register MR, a sequence of "0"'s are stored and, further, into the location of the next element code, (that is, i) to the element code designated by the register "(R2+1)(" 14 minus 1 (that is, (i+j−1)), a sequence of "1"'s are stored.

Figure 6:
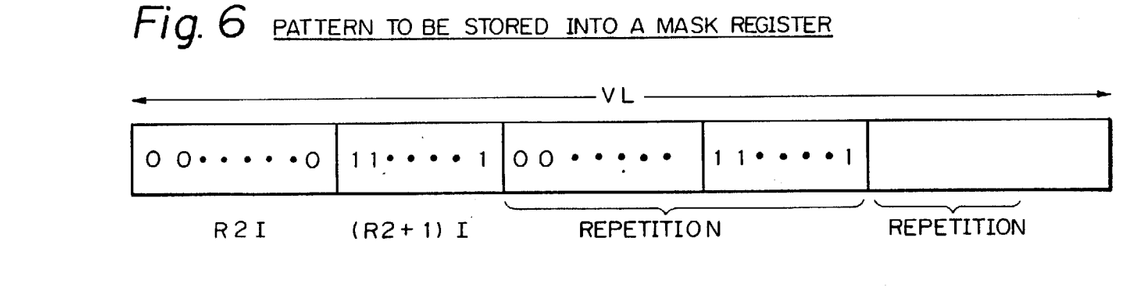
FIG. 6 shows a pattern to be stored into a mask register.

In this case, if the above-mentioned N portion is "1", the VGMZ control portion 15 detects that the N portion of the instruction is "1" and with reference to both the register "R2I" 13 and the register "(R2+1)I" 14, an gate means 31 of the mask pipeline adder 32 is controlled via a control line 152 and the VGMZ control portion 15 operates so that the same operation as the above-mentioned, may be repeated for the vector length (VL), such that the repetitive pattern as shown in FIG. 6 is stored in the mask register "MR".

If the element numbers shown by the register "R2I" 13 and the register "(R2+1)I" 14 are longer than the vector length (VL), the processing of exceptional events such as error processing is carried out.

If the MI portion is "1" n the above-mentioned operation, the pattern which negates the above-mentioned pattern is stored in the mask register MR.

A feature of the present invention is that a sequence of "0" or "1" is stored at the location of the head element of the mask register to the element number shown by the general-purpose register designated by the R2 portion minus 1, and a sequence of "1" or "0" is stored at the location of the next element to the element number shown by the general-purpose register designated by the R2 portion plus 1 minus 1. This process is repeated, for instance, for the vector length (VL), needed to generate a mask pattern.

In the aforementioned embodiment, an example is explained wherein the element number subtracted by the mask pattern adder is designated by both a register "R2I" 13 (i-th element is designated) and a register "(R2+1)I" 14 (j-th element is designated). Generally, by setting n designated registers, a 0/1 pattern such as "0" of i-th element +"1" of j-th element +

"0" of the k-th element +- - - is generated, all the remaining elements are made "0" or "1", and a mask pattern can be generated such that the above-mentioned 0/1 pattern is repeated for the vector length (VL) as a fundamental pattern.

In the above-mentioned example, a field "N" which designates to the VGMZ instruction that a specified fundamental pattern should be repeated until the end of the vector length (VL) is provided, accordingly the VGMZ instruction may be provdided without the field N.

In this case, the above-mentioned fundamental pattern is not repeated until the vector length (VL) is reached, so it can be concluded that the all "0"'s or all "1"'s are stored in the location of all the remaining elements.

The mask pattern generating system in accordance with the present invention can be applied even when the inverting pattern will be used in place of the aforementioned fundamental pattern.

Although, certain perferred embodiments have been shown and described it should be understood that changes and modifications may be made therein without departing from the scope of the appended claims.

We claim:

1. A system for generating a mask pattern for a vector data processor having a mask register and a vector register in which, the value of the mask register is "1", a calculation is executed for the corresponding element of the vector register, and when the value of the mask register is "0", a calculation is not executed, in accordance with a calculational mask function, said system comprising:

designation means for designating sequential "i" elements of "0" or "1" from a beginning element of the mask register and subsequent sequential "j" elements of "1" or "0"; and control means for rendering the "i" elements to be "0" or "1", the "j" elements to be "1" or "0", and the remaining elements to be all "0's" or all "1's", when "i" plus "j" is smaller than a vector length which is the object of the calculation of a vector data operand used in a vector instruction, a desired pattern of "0" or "1" being generted in the mask register.

2. A system according to claim 1, wherein the generation of a mask pattern is carried out by designating the number ($N_1, N_2, - - - N_i$) of elements and by obtaining a fundamental bit sequence of the summed number ($N_1 + N_2 + - - - N_i$) of elements whre "0"'s and "1"'s are repeated as a basic pattern, and the remaining elements have a pattern of all "0"'s or all "1"'s corresponding to a respective number of elements, and accordingly, a desired mask pattern of "0" or "1" being generated in the mask register.

3. A system for generating a mask pattern for a vector data processing apparatus having a mask register and a vector register in which, when the value of the mask register is "1", a calculation is executed for the corresponding element of the vector register, and when the value of the mask register is "0", a calculation is not executed, in accordance with a calculational mask function, said system comprising:

designation means for designating sequential "i" elements of "0" or "1" from a beginning element of the mask register and subsequent sequential "j" elements of "1" or "0"; and control means for repeating "i" elements of "0" or "1" and "j" elements of "1" or "0" until a vector length, which is the object of calculation of a vector data operand used in a vector instruction, is attained, when "i" plus "j" is smaller than the above-mentioned vector length, desired mask patterns including repetitive patterns being generated in the mask register.

4. A system according to claim 1, wherein the generation of a mask patter is carried out by designating the number ($N_1, N_2, - - - N_i$) of elements as a fundamental bit sequence of the summed number ($N_1 + N_2 + - - - N_i$) of elements where "O"'s and "1"'s are repeated as a basic pattern, repeating the basic pattern until a vector length, which is the object of calculation of a vector data operand, is attained, and accordingly, generating desired mask patterns including repetitive patterns in the mask register.

5. A method for generating a mask pattern for a vector data processor having a mask register and a vector register in which, when the value of the mask register is "1", a calculation is executed for the corresponding element of the vector register, and when the value of the mask register is "0", a calculation is not executed, in accordance with a calculational mask function, said method comprising the following steps:
   (a) designating sequential "i" elements of "0" or "1" from a beginning element of the mask register and subsequent sequential "j" elements of "1" or "0";
   (b) rendering the "i" elements to be "0" or "1", the "j" elements to be "1" or "0", and the remaining elements to be all "0"'s or all "1"'s, when "i" plus "j" is smalle than a vector length which is the object of the calculation of a vector data oerand used in a vector instruction; and
   (c) generating a desired mask pattern of "0" or "1" in the mask register.

6. A method according to claim 5, wherein said step (c) comprises the substeps of:
   (i) designating the number ($N_1, N_2 \cdots N_i$) of elements;
   (ii) generating a fundamental bit sequence of the summed number ($N_1 + N_2 + \cdots N_i$) of elements, where "0"3 s and "1"'s are repeated, as a basic pattern;
   (iii) repeating the basic pattern until a vector length, which is the object of the calculation of a vector data operand is attained; and
   (iv) generating desired mask patterns including repetitive patterns in the mask register.

* * * * *

UNITED STATES PATENT AND TRADEMARK OFFICE
CERTIFICATE OF CORRECTION

PATENT NO. : 4,841,438

DATED : JUNE 20, 1989

INVENTOR(S) : AKIRA YOSHIDA ET AL.

It is certified that error appears in the above-identified patent and that said Letters Patent is hereby corrected as shown below:

Col. 1, line 12, "processor" should be --processors--;
      line 30, "mak" should be --mask--;
      line 50, "37" should be --"--.

Col. 2, line 16, "inthe" should be --in the--.

Col. 4, line 16, "(A)" should be --(AR)--;
      line 34, "{(R2 + 1)}" should be --{(R2 + 1)I}--;
      line 51, "(V1)" should be --(VR)--;
      line 51, "Alternatively" should be --Alternatively,--.

Col. 5, line 54, "23" should be --23,--;
      line 63, "r2" should be --R2--;
      line 66, delete "denote".

Col. 7, line 1, delete "(" (first occurrence);
      line 8, delete "37";
      line 12, "from" should be --of--;
      line 14, "inthe" should be --in the--;
      line 14, "MR" should be --(MR)--;
      line 17, ""(R2 + 1)("" should be --"(R2 + 1)I"--;
      line 22, delete "an";
      line 33, "n" should be --in--;
      line 62, "provoided" should be --provided--;
      line 66, delete "the".

UNITED STATES PATENT AND TRADEMARK OFFICE
CERTIFICATE OF CORRECTION

PATENT NO. : 4,841,438

DATED : JUNE 20, 1939

INVENTOR(S) : AKIRA YOSHIDA ET AL.

It is certified that error appears in the above-identified patent and that said Letters Patent is hereby corrected as shown below:

```
Col.  8, line 28, "generted" should be --generated--;
         line 34, "whre" should be --where--;
         line 62, "patter" should be --pattern--.

Col.  9, line 17, "smalle" should be --smaller--.

Col. 10, line  1, "oerand" should be --operand--;
         line 10, delete "3".
```

Signed and Sealed this

Twenty-seventh Day of March, 1990

*Attest:*

JEFFREY M. SAMUELS

*Attesting Officer*     *Acting Commissioner of Patents and Trademarks*